May 10, 1927.
E. ROBERTS
1,627,868
CENTRIFUGAL MACHINE
Filed Dec. 24, 1921
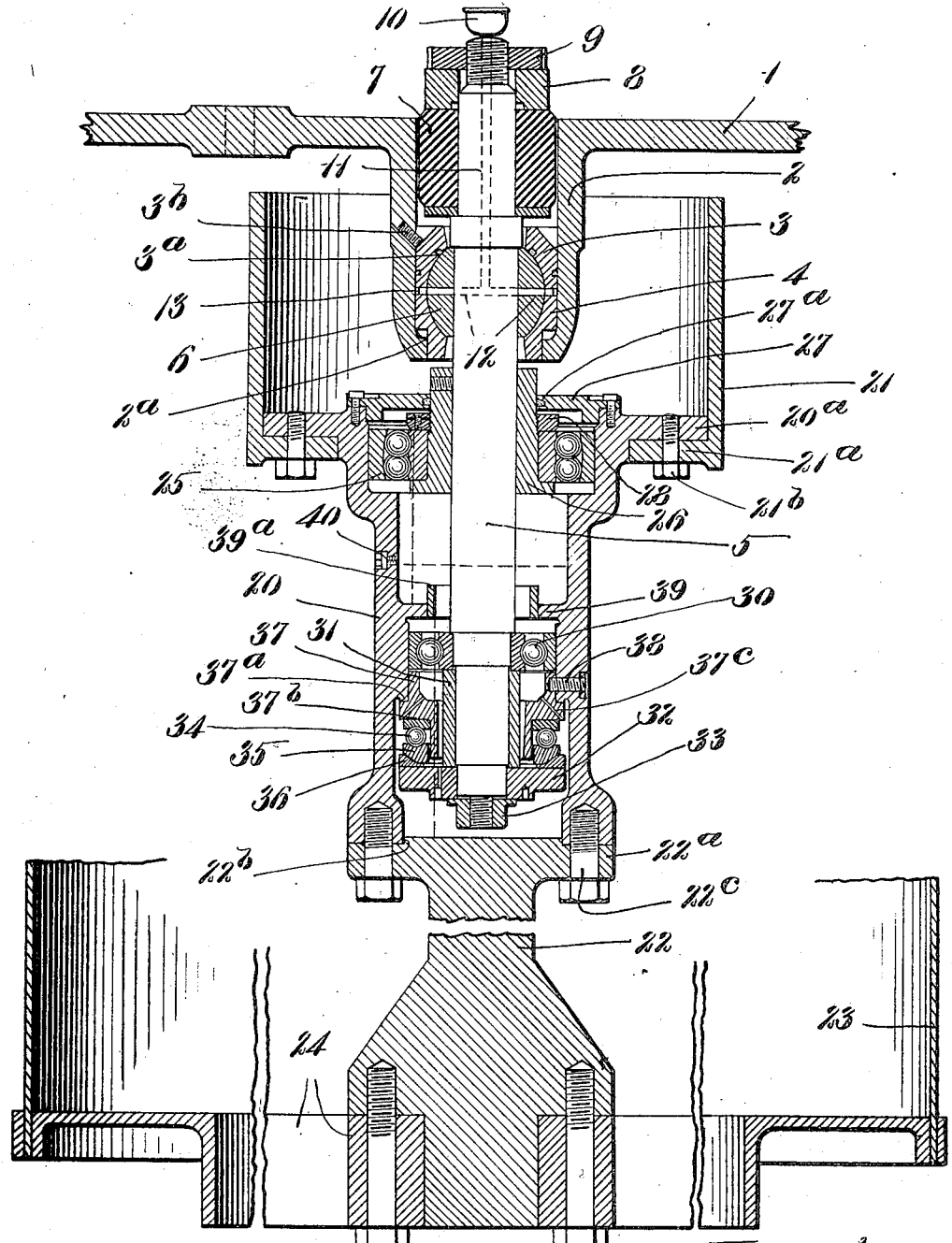
Inventor:
Eugene Roberts,
by Geo. N. Goddard, Atty.

Patented May 10, 1927.

1,627,868

UNITED STATES PATENT OFFICE.

EUGENE ROBERTS, OF SALT LAKE CITY, UTAH, ASSIGNOR TO THE WESTERN STATES MACHINE COMPANY, OF SALT LAKE CITY, UTAH, A CORPORATION OF UTAH.

CENTRIFUGAL MACHINE.

Application filed December 24, 1921. Serial No. 524,664.

This invention relates to centrifugal machines particularly of the gyratory suspension type and is intended to provide a simple, durable and reliable construction and arrangement by which certain difficulties heretofore encountered with this type of machine may be eliminated or overcome.

Machines of this type, particularly those used for heavy unbalanced loads, such for example as centrifugals for extracting juice from sugar or the like, are subjected to very severe sudden and unequal strains upon their bearings which leads to rapid deterioration of the bearings and to unsatisfactory service.

After thorough investigation and study I have discovered that these troubles are in part due to peculiar stresses which tend to make the gyratory suspension member which carries the rotary centrifugal basket shaft, as well as the basket shaft itself, lift from their supporting bearings with consequent injury to the bearings and with resulting unsatisfactory performance of the machine.

A centrifugal machine of the suspended gyratory type in theory acts upon the principle of a top and should be free to adjust itself to its own proper axis of rotation and anything that interferes with the proper self-adjustment of the machine or tends to disturb such adjustment to that extent impairs the efficiency of the machine and brings undue stress upon the parts and causes undue heating of the bearings.

The present improvements are founded on the discovery of the causes which are detrimental to the operation of the machine and are intended to provide simple and effective arrangements by which the suspension member and the basket shaft, respectively, are properly confined to their appropriate movements while allowing them the greatest freedom to function in the required manner. Certain provisions are also made to secure proper lubrication of the bearings in order to avoid heating or binding which interferes with the proper movements of the parts. Certain features, such as the rotary bearing suspension of the basket shaft and ball and socket joint constructions to positively prevent lifting of the suspension element together with provision for lubrication of the latter were set forth in the application for United States Letters Patent filed by me May 7, 1921, Serial No. 470,440, which application has been abandoned in favor of the present application which, as to such features, forms a continuation thereof.

To this end the present invention comprises, in general terms, the combination with a fixed hanger and a gyratory suspension member mounted thereon to oscillate in any direction against yielding resistance, with a rotary basket-carrying shaft having rotary bearing engagement with the suspension member or elements by means of the rotary bearings disposed to sustain lateral pressure and endwise or axial thrust in both directions, the suspension member itself being also held against axial or endwise movement so that it can not lift from its seat. Provision is also made for proper lubrication of the bearings interposed between the suspension member and the rotary shaft as well as the gyratory bearing from which the machine is operatively suspended.

In the accompanying drawings is illustrated a simple and convenient construction and arrangement embodying the principles of this invention, the figure of the drawings shown comprising a vertical central sectional view of the assembled machine with a substantial length of the lower part of the basket shaft cut out to permit a large scale illustration.

According to the arrangement shown specifically in the drawings I employ a fixed hanger 1 having a depending hollow or tubular member 2, in whose lower portion is seated a lower concave spherically curved member 4, which coacts with a similar concave spherically curved upper socket member 3 to form lower and upper bearing members having bearing engagement with a spherically curved external ball 6 to which the gyratory suspension spindle is secured intermediate of its ends so as to form conjointly with said ball a gyratory non-rotary suspension element. One or more set screws 3$^b$, adjustably carried in the socket portion 2 of the hanger, serves to hold the upper socket member against lifting under the upward thrust of the suspension element. It will, therefore, be seen that the upper and lower socket member, engaging the external spherically curved bearing surface of the suspension element above and below its equatorial diameter, serve to keep said suspension element in position to gyrate about a single fixed central point so that it is impossible for the suspension element to lift from its supporting seat under the thrust and leverage produced when a heavy unbalanced load swings to one side thus causing the yielding or elastic centralizing buffer 7 to act as a fulcral support which, in machines as heretofore mounted, resulted in a lifting action of the suspension element from its seat.

A centralizing buffer 7 of yielding material surrounds the upper end of the spindle 5 so as to oppose a yielding resistance to the gyration of the spindle, thereby preventing excessive swaying of the machine. A compression ring or follower 8 is forced down tightly against the buffer by means of the compression nut 9 which has screw threaded engagement with the upper end of the shaft.

I have found that much trouble with the operating of suspended centrifugal machines is due to the failure of the gyratory or spherical bearing to work smoothly to permit the machine to properly center itself. I have, therefore, made simple provision for keeping this gyratory or spherical bearing sufficiently lubricated to prevent it from binding or sticking in its socket. With this object in view the upper end of the shaft is provided with a vertical bore or duct 11 which branches laterally into lateral ducts 12 extending to the outside spherical bearing. For convenience a grease cup 10 may be carried at the upper end of this bore to supply grease as needed to the spherical bearing surfaces. An annular grease distributing groove 13 may be provided in either or both socket members so that the grease flowing through the transverse duct 12 may be carried entirely around the supporting ball of the suspension element. I prefer to provide a grease-retarding packing or gasket, as shown at 3ª, to prevent the flow of grease farther than need be on this bearing surface.

Not only is it important to make provision against the lifting of the suspension member from its seat, but it is also important to prevent the rotary shaft from lifting or rising in relation to the suspension element. Moreover, the proper lubrication of the bearings interposed between the suspension element and the rotary shaft is also a matter of great importance.

The particular type of shaft shown in this case comprises an upper tubular or hollow section 20 inside of which the rotary bearing elements are mounted, and which also forms an oil reservoir capable of carrying a predetermined amount of oil, and a lower preferably solid shaft section 22 to whose lower end the hub of the spider 24 of the centrifugal basket 23 is secured.

The upper hollow section 20 of the centrifugal basket shaft is of suitable internal diameter to allow self-contained or complete ball bearings to be interposed between the spindle 5 and the wall of the hollow shaft section. At the level of the upper end portion of shaft section 20, I secure a bearing retaining sleeve 26 to the spindle by means of a set screw or the like, the bottom flange of said sleeve forming a shoulder to support the inner race of the radial ball bearing 25 which is held down firmly against said shoulder by means of the set nut 28 which is screwed on the outside upper portion of said sleeve 26. The outer race of this radial bearing is in contact with the interior of the shaft section 20 to transmit the radial thrust thereof. At its upper end the hollow shaft section is provided with a radial flange 20ª which is overlapped by the flange 21ª of the belt pulley 21 by which the centrifugal is driven. Two flanges are detachably bolted together by means of vertical bolts 21ᵇ.

The lower radial ball bearing 30 is located on the spindle 5 with the upper face of the inner race in close contact with an annular shoulder of the spindle, while beneath the inner race is a spacing collar 31 whose lower end rests upon the thrust disk 32 which is held in place by retaining nut 33 on the reduced lower end of the spindle.

I prefer to take the downward thrust bearing load on a separate thrust bearing, and to this end I provide an annular chair or thrust member 37 which has an external shoulder at 37ª resting against an overhanging shoulder formed on the interior wall of the lower portion of the shaft section 20. The lower end of said annular chair or thrust member is reduced in diameter to form an inwardly extending shoulder at 37ᵇ to rest upon the upper race of the anti-friction thrust bearing 34. The internal diameter of the lower portion of the thrust member 37 is somewhat larger than the spacing collar 31 which it surrounds so as to allow ample clearance for the flow of oil vertically. To assist lubrication, a series of diagonal oil holes 37ᶜ are provided extending from the inside to the outside periphery of said thrust member.

The lower ball race 35 is bevelled or spherically curved on its under side to rest on a similarly curved supporting ring 36 so as to allow a slight play of the thrust bearing to permit it to accommodate itself to any slight deflection between the shaft and the inside suspension spindle.

Instead of providing an additional thrust bearing to sustain the upward thrust of the basket shaft I prefer, since this upward thrust is not as heavy as the downward thrust, to provide for such thrust in the same bearing that sustains the radial thrust at the lower end of the spindle. It will be observed that the races of the ball bearing 30 are cut with quite deep grooves so that the balls project sufficiently inside each ball race, in accordance with well known principles of construction of these devices, to sustain a substantial vertical thrust as well as to carry the normal radial thrust of the rotating shaft. In other words, the ball bearing 30 is a combination thrust and radial bearing. The upper end of the annular thrust member 37 is barely out of contact with the under side of the outer race of the bearing 30 so as to allow for a slight expansion between these two members and yet prevent any appreciable upward movement of the shaft relative to the spindle.

The annular thrust member 37 is held in position by a screw 38 passing through the wall of the hollow shaft section.

The interior of the hollow shaft section 20 is shown partly divided into upper and lower chambers by means of the inwardly projecting flange 39 which also carries an upturned flange or ring $39^a$. This inwardly projecting flange has its inner face arranged substantially in line with the outer face of the inside ball race of the bearing 30 so as to retain a predetermined quantity of oil in the lower chamber under the influence of centrifugal force, while allowing the residue of the oil flowing into the upper chamber for the purpose of lubricating the upper bearing 25.

It is desirable that there should not be so much oil inside the upper shaft section as to create a tendency for it to escape out of the upper end of the shaft where it could accumulate on the interior face of the pulley 21 which will usually form one element of a brake by which the centrifugal is stopped although such brake is not here shown. On the other hand, it is desirable that there should be a sufficient supply of oil to keep thoroughly lubricated all the bearings inside said shaft section. With this object in view, I have located a filling orifice at such precise height in the wall of the upper section that when oil is poured into the interior said filling orifice establishes the proper level for the measured quantity of oil required to give the proper service. This filling orifice is normally closed by a tight screw plug 40. Since it is not practical to inspect the interior bearings this measuring orifice for the oil constitutes an important improvement in this machine.

As the oil tends, when the machine is at rest, to run down into the lower chamber of the hollow shaft section, the upwardly projecting ring $39^a$ tends to form an oil cup which will retain a substantial quantity of oil so that as soon as the shaft starts rotating the oil in this oil cup will speedily find its way to the upper bearing 25 and keep it lubricated. The upper end of this oil-retaining ring $39^a$ is below the level of the filling orifice 40 so that it does not in any way interfere with the proper measuring of the contained oil by means of the properly located filling orifice.

The two shaft sections may be secured together in any suitable manner. In the present case I have shown the lower shaft section 22, provided with an enlarged head $22^a$ which is provided with a peripheral annular groove to form an annular shoulder as shown at $22^b$, which exactly fits inside the lower end of the upper section 20 as to secure exact registry between these two sections which are detachably held together by means of a spherically arranged series of vertical fastening bolts $22^c$.

A lid or cover 27 is secured in position to tightly close the upper end of the hollow shaft section, and this cover is provided on its interior face with a ring $27^a$ of packing felt or other suitable material to prevent the escape of oil.

It will be understood that there is a tendency in machines of this type for the oil to work upward when the machine is running, and as the oil also under centrifugal action tends to build up in cylindrical form on the interior face of the wall, I have indicated in dotted lines the location of the inside face of each column of oil in the upper and lower compartments which shows that each bearing will be completely lubricated when the machine is in motion, and that neither bearing can rob the other of its needed supply because of the oil-retaining rings or members above described.

It will be observed that neither the suspension member nor the centrifugal basket shaft can lift from their proper positions, while the lubrication of the spherical or gyratory bearing prevents the machine from binding in any position. Complete lubrication is afforded for all bearings and the machine can be readily dismantled wholly or in part for inspection or replacement of parts.

The diagonal outwardly extending oil holes $37^c$ in the annular thrust member 37 tend to provide a slight circulation of the oil in the lower chamber since, as the oil works up above the level of said thrust member, the centrifugal action tends to expel some of the oil through said holes which descends to the thrust bearing and forces a corresponding amount of oil upward through the large centrifugal bore of said thrust member.

While the leverage exerted by the side swing of the heavy basket which is resisted by the centralizing buffer is one of the chief causes of the displacement or lifting of the ball from its seat, there is another factor in belt driven machines particularly which tends toward this same bad result, and that is the pull exerted by the belt on the driving pulley when the centrifugal swings away from the central or vertical axis in which case the pull of the belt instead of being at right angles to the inclined axis of the shaft is at an oblique angle thereto, thus causing the belt itself to exert some lifting action on the machine. In both cases, however, the socket members, having bearing engagement above and below the equatorial plane of the bearing ball or spherical bearing surface, positively prevents such tendency toward vertical displacement or lifting.

What I claim as my invention is:

1. In a gyratory suspended centrifugal machine, the combination of a fixed hanger, upper and lower concave spherically curved socket members, securely held in said hanger, a suspension element provided with a convex spherically curved bearing surface engaged between said socket members to have a gyratory support therein, a centrifugal basket shaft rotatably suspended to gyrate and rotate about the central axis of said suspension element, antifriction bearing elements interposed between the suspension element and the basket shaft, said bearings being disposed to sustain the lateral thrust and the axial thrust in both directions of the basket shaft, substantially as described.

2. In a gyratory suspended centrifugal machine, the combination of a fixed hanger, a gyratory non-rotary suspension element provided with an external spherically curved bearing surface, cooperating upper and lower socket members having concentric bearing engagement with said spherically curved bearing surface on opposite sides of the equatorial plane of said bearing, said socket members being held in said hanger against displacement, a centrifugal basket shaft suspended to rotate about the central axis of said suspension element and anti-friction bearing elements interposed between said shaft and the non-rotary suspension element to support the shaft against axial thrust in either direction, substantially as described.

3. In a gyratory suspended centrifugal machine, the combination of a gyratory suspension element provided with an external spherically curved bearing surface, a fixed hanger provided with upper and lower spherically curved socket members arranged to afford bearing engagement with the curved bearing surface of the suspension element, means for removably locking the upper socket member in its operative position, centralizing means opposing a yielding resistance to the gyration of the suspension element, a centrifugal basket shaft having rotary bearing support on said suspension element and anti-friction bearing elements by which said shaft is held against axial displacement while being allowed to freely rotate in relation to the suspension member.

4. In a gyratory suspended centrifugal machine, the combination of a gyratory suspension spindle, a rotary basket shaft suspended thereon and comprising upper and lower sections, the upper section being of tubular construction and forming an oil reservoir, antifriction bearing elements interposed between the suspension spindle and said upper section, and a sealable filling orifice located in the side of the upper section at a level to provide a means of measuring the quantity of oil supplied thereto, substantially as described.

5. In a gyratory suspended centrifugal machine, the combination of a gyratory spindle suspended from a universal joint, a plurality of rotary bearing elements carried thereby at different distances below said universal joint, a basket shaft comprising an upper hollow section and a lower basket engaging section, the upper section inclosing and engaging said bearing elements by which it is rotatably supported, said upper section forming an oil reservoir divided into upper and lower intercommunicating oil chambers by a transverse partition arranged to receive a predetermined amount of oil and to prevent the draining of the necessary supply of oil from one chamber to the other chamber, substantially as described.

6. In a gyratory suspended centrifugal machine, the combination of a gyratory spindle suspended to swing from against the yielding resistance about a universal joint, a horizontally divided rotary basket shaft whose upper section surrounds the lower portion of said spindle and has a transverse partition subdividing the interior into upper and lower oil and bearing-containing chambers, antifriction bearing elements located in said chambers to afford rotary bearing support between the spindle and said shaft the upper chamber being provided with a lateral oil-filling orifice located to correctly gage the proper supply of oil for said section, said transverse partition being formed to allow oil to pass from one chamber to the other while retaining a certain amount of oil in each chamber, substantially as described.

7. In a gyratory suspended centrifugal machine, the combination of a gyratory spindle suspended upon a universal joint, a horizontally divided rotary basket shaft whose upper section is hollow to receive bearing elements therein and carry a supply of oil therefor, said upper section being closed at top and bottom, upper and lower antifriction bearing elements disposed in said upper section to sustain axial thrust in both directions and to afford lateral bearing support for said shaft, and means interposed between the upper and lower section to establish a definite oil line in each section when the machine is rotating, substantially as described.

8. In a gyratory suspended centrifugal machine, the combination of a rotary suspension spindle mounted to swing about a universal joint, antifriction bearing elements mounted thereon at different levels below the point of suspension, a horizontally divided basket-carrying shaft whose upper section is hollow and surrounds and engages said bearing elements for lateral and axial support, said upper section being provided with a lateral filling orifice at a predetermined level to gage the proper supply of oil for lubrication of said bearings, and means arranged inside said hollow shaft section to maintain a circulation of oil therein when the shaft is rotating, substantially as described.

9. In a gyratory suspended centrifugal machine, the combination of a hanger, a non-rotating gyratory suspension spindle supported therein to swing upon a spherical ball joint arranged to positively prevent axial movement of said suspension spindle in either direction, a rotary basket shaft suspended to rotate on and swing with said suspension spindle, the suspension spindle being provided with a lubricating passage for conveying lubricant to the spherical surfaces of said joint, substantially as described.

10. In a gyratory suspended centrifugal machine, the combination of a hollow hanger, upper and lower spherical socket members secured therein, a gyratory suspension spindle provided with a spherically curved bearing surface having universal joint engagement with said upper and lower socket member, said spindle being provided above its center of support with an interior lubricating duct having lateral communication with said spherically curved bearing surface to lubricate the same, a bearing centralizing elastic buffer interposed between the upper end of the spindle and the hanger, means for preventing the escape of lubricant from the spherical bearing surface to said buffer, and a rotary basket-carrying shaft suspended on said spindle to rotate thereon and gyrate therewith, substantially as described.

In witness whereof, I have subscribed the above specification.

EUGENE ROBERTS.